United States Patent Office 3,030,317
Patented Apr. 17, 1962

3,030,317
THIOETHER CATION EXCHANGE RESINS
Melvin J. Hatch, Freeland, Mich., assignor to The Dow Chemical Company, Midland, Mich., a corporation of Delaware
No Drawing. Filed May 12, 1958, Ser. No. 734,397
9 Claims. (Cl. 260—2.2)

This invention concerns new ionizable polymers of thioethers containing a vinylbenzylthio radical.

The products of this invention are polymers of thioethers containing a vinylbenzylthio radical and having the following repeating units:

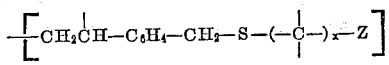

wherein

represents a hydrocarbonyl or substituted hydrocarbonyl group of the aliphatic, aromatic or cycloaliphatic series, $x$ is an integer not greater than 2, and Z is $-CO_2H$, $-P(O)(OH)_2$, $-SO_3H$, or exchangeable salts thereof.

The products of this invention are prepared by reacting a polymeric vinylbenzyl sulfonium halide, halide being inclusive of chloride and bromide, in swollen condition with a solution of a water-soluble mercaptide having the representative formula:

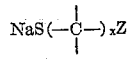

wherein

$x$ and Z have the significance previously given. Advantageously, an aqueous solution of the nucleophilic mercaptide is used. Highly polar solvents such as water-soluble alcohols can also be used together with water or in a substantially anhydrous condition in forming the nucleophile solutions. Alternatively, water-insoluble solvents or diluents dispersed in water can be used. Although it is generally desirable to have the sulfonium resin in a water-swollen condition for reaction with the nucleophile, this is not essential. A polar solvent or the nucleophile itself can act as a swelling agent for the sulfonium resin. Whenever the nucleophile can be absorbed into the sulfonium resin, as by ion exchange absorption, and remain in the resin phase when the solvents are removed, it is possible to obtain reaction merely by heating the dry sulfonium resin which contains the absorbed ionogenic nucleophile.

The polymeric vinylbenzyl sulfonium halide anion exchange resins advantageously used in making the ion exchange resins of this invention are the reaction products of vinylaryl polymers such as those of styrene, vinyltoluene, vinylxylene, chlorostyrene, dichlorostyrene, vinylnaphthalene, acenaphthene, etc. containing an average of between about 0.25 and 1.5 halomethyl groups per aromatic nucleus, which are crosslinked, advantageously to the extent of between 0.2 and 20 percent, with crosslinking agents such as divinylaromatic hydrocarbons, and a sulfide which contains one or two alkyl groups containing between one and four carbon atoms and/or, correspondingly, one or two hydroxyalkyl groups containing between two and four carbon atoms, i.e., dimethyl, diethyl, dipropyl, methyl hydroxyethyl, dibutyl sulfide, etc., pursuant to the procedure of copending U.S. patent application, Serial No. 675,030, filed July 30, 1957, now abandoned. The sulfonium anion exchange resin can be reacted in the halide form, as produced, or it can be converted to other ionic forms before reaction, e.g., the sulfate form.

In practice, the cation exchange resins of this invention are made by reacting a swollen polymeric vinylbenzyl sulfonium halide resin, as indicated above, with a stoichiometric proportion of a nucleophilic mercaptide, i.e., an alkali metal mercaptide containing substituent groups having cation exchange properties. Representative alkali metal mercaptides include $$NaSCH_2CO_2Na, \ NaS(CH_2)_2SO_3Na,$$
$$NaSCH(CO_2H)CH_2CO_2H,$$
$$NaSCH_2CH_2PO_3Na_2,$$
$$NaSC_6H_4CO_2Na(1,2)$$

and the like. Reaction temperatures between 50° and 100° C. for reaction times of several hours up to about 60 hours are advantageously employed in reacting the sulfonium resins with the indicated nucleophiles. Generally the nucleophile is present in excess up to about 200 percent of theory. The excess can be recovered, hence the amount of excess is not important. Alternatively, the ion exchange resin can be formed in situ from halomethyl-containing vinylaryl polymers and sulfides, as indicated, and therein reacted with the indicated nucleophilic mercaptides. Thus, such a one-step method can be used instead of the two-step method wherein the sulfonium resin intermediate is first formed and then reacted with a nucleophilic mercaptide, as indicated. The one-step method is shown in Example 4.

A method for preparing a vinylbenzyl sulfonium resin reactant is as follows: A quantity of 100 grams of chloromethylated styrene-divinylbenzene copolymer beads containing 2 percent combined divinylbenzene, 100 grams of dimethyl sulfide, 300 mls. of methylene dichloride, 300 mls. of methanol and 450 mls. of water were refluxed for 33 hours with stirring under a hood. The product beads were filtered, washed alternately with water, methanol, then with water again. Titration with silver nitrate showed that the capacity of the wet beads was 0.67 meq./ml. Total weight of the wet filtered product was 540 grams. The settled volume of 50 grams of the wet filtered product was 67 mls.

Typical reactions of this invention can be summarized by the following equation:

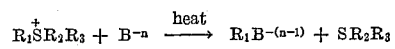

wherein $R_1$ = a vinylbenzyl resin matrix and

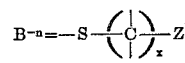

all symbols having the meaning as previously described in detail.

The following examples show ways in which the invention has been practiced.

*Example 1*

REACTION OF SULFONIUM RESIN WITH AQUEOUS NaSCH₂CO₂Na

To 50 grams (67 mls. wet settled volume) of the filtered, washed sulfonium resin described above was added 33 grams of 95 percent thioglycolic acid, 100 mls. of water and 21 grams of 98 percent sodium hydroxide. The flask containing the mixture was covered loosely and the mixture was heated on a steam bath under a hood for 40 hours. The resulting cation exchange resin product was filtered, rinsed alternately with water and with concentrated hydrochloric acid, then given a final water rinse. The resulting resin was filtered and weighed and amounted to 19 grams of product. It wet settled volume was 26 mls. This product was then treated with excess 10 percent sodium hydroxide solution, which caused it to swell. After washing with several bed volumes of water, the resulting beads had a wet filtered weight of 38.5 grams. Their wet settled volume was 52.5 mls. This resin adsorbed $Cu^{++}$ strongly from an aqueous solution of copper sulfate. The capacity for $Cu^{++}$ was 0.67 meq./ml.

*Example 2*
REACTION OF SULFONIUM RESIN WITH DISODIUM β-MERCAPTOETHANE SULFONATE A quantity of 100 grams of vinylbenzyl sulfonium resin made similar to the preceding description by reacting stoichometric proportions of beads of a chloromethylated crosslinked copolymer of 98 weight percent styrene and 2 percent divinylbenzene with dimethylsulfide, containing 0.95 meq. of $Cl^-$ per ml., wet settled volume, was heated in a lightly covered flask for 32 hours on a steam bath together with 18 grams of β-mercaptoethane sulfonic acid, 8 grams of sodium hydroxide and 200 ml. of water. The resulting cation exchange resin was filtered and washed alternately with water, acetone, water, N-sodium hydroxide and finally with water. It was then vacuum filtered and washed. A quantity of 100 ml. of N/10 copper sulfate solution was passed through a sample of 2 ml. of the resin. The resin was then rinsed with water and the $Cu^{++}$ on the resin was eluted with 100 ml. of N-sulfuric acid. The copper sulfate was titrated iodometrically and the resin capacity was determined to be 0.82 meq. $H^+$ capacity, resin in $H^+$ form.

*Example 3*
REACTION OF SULFONIUM RESIN WITH AQUEOUS TRISODIUM MERCAPTOSUCCINATE A mixture of 100 grams (wet filtered weight) of a 2 percent crosslinked sulfonium resin, prepared as previously described, 50 grams of mercaptosuccinic acid, 35 grams of 98 percent sodium hydroxide pellets and 300 ml. of water was heated on a steam bath under a hood for 48 hours in a flask provided with a reflux condenser and a stirrer. The cation exchange resin beads so obtained were filtered, washed with several bed volumes of water and weighed. Their wet filtered weight was 99 grams. The resulting wet resin was rinsed with 8 N hydrochloric acid, whereupon it shrank approximately 30 percent. After washing alternately with several bed volumes of 10 percent sodium hydroxide and water, the wet filtered resin weight was again 99 grams. The wet settled volume of the resulting resin beads was 133 ml. It had a $Cu^{++}$ capacity of 0.91 meq./ml.

*Example 4*
IN SITU REACTION (ONE-STEP METHOD)

A quantity of 50 grams of beads of a chloromethylated crosslinked copolymer of 96 weight percent styrene and 4 percent divinylbenzene (50–100 mesh, 16.2 percent $Cl^-$), 120 grams of mercaptosuccinic acid, 85 grams of sodium hydroxide pellets, 125 grams of toluene, 150 ml. of dioxane, 250 ml. of water and 100 ml. of dimethyl sulfide was mixed together in a two-liter, three-necked flask equipped with a stirrer and an efficient reflux condenser. The mixture was heated at reflux (62° C.) for 21 hours. The product resin was filtered and washed well with water, methanol, and again with water. Final volume of wet resin product was 168 ml. The wet product had a capacity for $Cu^{++}$ of 1.56 meq./ml. (0.73 gram atoms $Cu^{++}$/liter).

*Example 5*
COMPARATIVE REACTIONS OF DIFFERENT SULFONIUM RESINS

Sulfonium anion exchange resins prepared by reacting 2 percent crosslinked chloromethylated polystyrene with methyl hydroxyethyl sulfide (I), diethyl sulfide (II), and dimethyl sulfide (III) were reacted with trisodium mercaptosuccinate and compared as to properties. Comparative preparations and properties are summarized in the following table.

TABLE

| Ex. | Reaction conditions | | | Product structure* | Properties of product | |
|---|---|---|---|---|---|---|
| | Weight sulfonium resin (wet filtered) | Weight reactant | Solvent, etc. | | Wet settled volume, ml. | Wet volume capacity, meq. Cu/ml. |
| I | 94 g. (9.9 ml.) | 5.0 g. mercaptosuccinic acid | 3.5 g. NaOH pellets + 150 ml. $H_2O$. Refluxed for 47 hours. | R—$CH_2$—SCH—COONa<br>\|<br>$CH_2$COONa | 9.9 | 0.71 |
| II | 10.3 g. (10.3 ml.) | do | do | R—$CH_2$—SCH—COONa<br>\|<br>$CH_2$COONa | 9.5 | 0.95 |
| III | 100 g. (134 ml.) | 50 g. mercaptosuccinic acid | 35 g. NaOH pellets + 300 mls. $H_2O$. Heated on steam bath 48 hours. | R—$CH_2$—SCH—COONa<br>\|<br>$CH_2$COONa | 133 | 0.91 |

\* R is a vinylbenzyl resin moiety.

*Example 6*
REACTION OF SULFONIUM RESIN WITH TRISODIUM MERCAPTOMETHANE PHOSPHONATE A mixture of

| | | |
|---|---|---|
| Chloromethane phosponic acid | g | 10 |
| Water | ml | 100 |
| NaOH | g | 5.5 |
| Sodium thioacetate | g | 10 | was heated on a steam bath over the week-end, ca. 2½ days. After cooling the reacted mixture to room temperature, 12 g. of NaOH pellets was then added, and the reaction mixture was then heated on a steam bath overnight under a nitrogen blanket. The reaction mixture was then allowed to stand one day at room temperature. An excess of concentrated hydrochloric acid was then added thereto to make the resulting solution strongly acidic. The acid solution was boiled while nitrogen was bubbled therethrough to remove $H_2S$. The solution then smelled strongly of acetic acid. The solution was filtered, caustic was added to the phenolphthalein end point, pH 8, and 5 g. of NaOH pellets was then added.

A quantity of 40 ml. of dimethylsulfonium chloride anion exchange resin (50–100 mesh, 2 percent crosslinked with divinylbenzene, 0.96 meq. $Cl^-$/ml.) was added to the resulting solution. The mixture was heated on a steam bath under nitrogen for 14 hours. The resulting product beads were filtered and washed with several bed volumes of water. A quantity of 16 ml. of the washed light yellow beads turned green upon absorbing $Cu^{++}$ from a solution of $CuSO_4$. A small bed of this resin was washed well with water, then with N-CuSO₄ solution until the bed was saturated with Cu⁺⁺. The bed was then rinsed with water, eluted with N-sulfuric acid and Cu⁺⁺ absorbed by the resin was determined to be 0.65 meq. Cu⁺⁺ per ml. of wet bed volume.

*Example 7*

REACTION OF SULFONIUM RESIN WITH DISODIUM THIOSALICYLATE

A quantity of 200 ml. of dimethylsulfonium chloride anion exchange resin (50–100 mesh, one percent crosslinked with divinylbenzene, 76 meq. Cl⁻/ml.) was heated in an aqueous medium with 23.4 grams of thiosalicyclic acid, Eastman tech. grade, and 12.2 grams of NaOH under a nitrogen blanket for 24 hours at about 100° C. When tested for its cation exchange capacity, the product had a capacity of 0.6 meq./ml., Na⁺ form, for exchanging Cu⁺⁺ ions.

*Example 8*

REACTION OF SULFONIUM RESIN WITH TRISODIUM 1-THIOCYCLOHEXANE-1,2-DICARBOXYLATE

To 30 g. of 1,2-cyclohexane dicarboxylic acid (0.236 mole) in which 1.0 g. of powdered red phosphorous had been suspended was added 36 g. (0.225 mole) of liquid bromine which had been dried in contact with concentrated sulfuric acid. The mixture became warm. The mixture was heated in a flask, fitted with a reflux condenser and drying tube, for 62 hours at approximately 50° to 60° C. The resulting syrup was heated in a beaker on a steam bath while a stream of nitrogen was bubbled through it to remove any residual bromine. The product was a yellowish thick oil. Titration for bromide ion before and after treating small samples of the oil with hot methanolic NaOH for an hour indicated the oil contained ca. 3.0 meq. of combined bromine per gram. This indicated that a considerable portion of 1-bromo-1,2-cyclohexane dicarboxylic acid had been produced.

To 15 g. of the 1-bromo-1,2-cyclohexane dicarboxylic acid syrup was added 21 g. of potassium thioacetate, 100 ml. of water, and 100 ml. methanol. Some yellowish solid, apparently sulfur, became evident. The mixture, under nitrogen, was heated at reflux for 20 hours. Then 50 ml. of 12-normal hydrochloric acid and 50 ml. methanol was added and the mixture was heated again on the steam bath. After 13 hours, 40 g. of NaOH pellets was added stepwise, and to the strongly basic solution was added 16 ml. of dimethylsulfonium ion exchange resin (8 meq. total chloride content, one percent crosslinked with divinylbenzene, 50–100 mesh) and the mixture was heated on the steam bath for 5 hours under nitrogen. The volume of beads then was 5.5 ml. (wet filtered volume, water-rinsed beads). The beads showed a Cu⁺⁺ capacity of 0.11 meq./ml. The beads, stripped of Cu⁺⁺ with acid, were heated 20 hours with 100 ml. of aqueous 10 percent NaOH solution, and the Cu⁺⁺ capacity of the beads was again determined. The beads had shrunk somewhat to a wet settled volume of 4.0 ml. The Cu⁺⁺ capacity was 0.16 meq./ml., so the total ion exchange capacity was unchanged.

What is claimed is:

1. A water-insoluble resinous composition suitable for the removal of cations from fluids which comprises the heat reaction product of (1) a poly(vinylbenzyl sulfonium) anion exchange resin and (2) a water-soluble alkali metal mercaptide having the formula

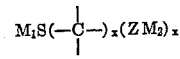

wherein M₁ represents an alkali metal,

represents a member of the group consisting of hydrocarbonyl substituents of the class consisting of the aliphatic, aromatic and cycloaliphatic series, $x$ is an integer inclusive of 1 and 2, Z represents a radical of the group consisting of —CO₂—, —PO₃— and SO₃, and M₂ represents a member of the group consisting of hydrogen and metals.

2. A water-insoluble resinous composition suitable for the removal of cations from fluids which composition consists esentially of a thioether group-substituted copolymer of a monovinylaromatic hydrocarbon with 0.2 to 20 weight percent of a divinylaromatic hydrocarbon, said substituent group having the formula

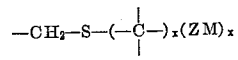

wherein M represents a member of the group consisting of hydrogen and metals,

represents a member of the group consisting of hydrocarbonyl substituents of the class consisting of the aliphatic, aromatic and cycloaliphatic series, $x$ is an integer inclusive of 1 and 2 and Z represents a radical of the group consisting of CO₂, —PO₃— and —SO₃—.

3. The product of claim 2, wherein Z represents the CO₂ radical.

4. The product of claim 2, wherein Z represents the SO₃ radical.

5. The product of claim 2, wherein Z represents the PO₃ radical.

6. The product of claim 2, wherein

is —CH₂CO₂—.

7. The product of claim 2, wherein

is —CH₂CH₂SO₃—.

8. The product of claim 2, wherein

is —CH(CO₂—)CH₂CO₂—.

9. The product of claim 2, wherein

is —CH₂CH₂PO₃—.

References Cited in the file of this patent

UNITED STATES PATENTS 2,768,990   De Jong _____ Oct. 30, 1956